US008713496B1

(12) United States Patent
Manohararajah et al.

(10) Patent No.: US 8,713,496 B1
(45) Date of Patent: Apr. 29, 2014

(54) SPECIFICATION OF LATENCY IN PROGRAMMABLE DEVICE CONFIGURATION

(71) Applicant: Altera Coporation, San Jose, CA (US)

(72) Inventors: Valavan Manohararajah, Scarborough (CA); David Galloway, Toronto (CA); David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/733,990

(22) Filed: Jan. 4, 2013

(51) Int. Cl.
*G06F 17/50* (2006.01)
*G06F 9/455* (2006.01)

(52) U.S. Cl.
USPC .......................... 716/108; 716/113; 716/116

(58) Field of Classification Search
USPC .......................... 716/108, 113, 116
See application file for complete search history.

(56) References Cited

U.S. PATENT DOCUMENTS

| 5,663,888 | A | 9/1997 | Chakradhar |
| 6,466,898 | B1 | 10/2002 | Chan |
| 7,299,458 | B2 | 11/2007 | Hammes |
| 7,594,195 | B2 | 9/2009 | Jain et al. |
| 7,739,641 | B1 * | 6/2010 | Barnes ......................... 716/113 |
| 7,926,016 | B1 * | 4/2011 | Sundararajan et al. ....... 716/116 |
| 8,286,137 | B2 | 10/2012 | Kahlon et al. |
| 8,296,696 | B1 | 10/2012 | Chiu et al. |
| 8,402,408 | B1 | 3/2013 | van Antwerpen et al. |
| 2002/0162097 | A1 | 10/2002 | Meribout |
| 2004/0068711 | A1 | 4/2004 | Gupta et al. |
| 2008/0276209 | A1 | 11/2008 | Albrecht et al. |
| 2009/0146686 | A1 | 6/2009 | Voogel et al. |
| 2010/0058261 | A1 | 3/2010 | Markov et al. |
| 2012/0227026 | A1 | 9/2012 | Goldman et al. |

OTHER PUBLICATIONS

Betz, V., et al., *Architecture and CAD for Deep-Submicron FPGAs*, Kluwer Academic Publishers, Feb. 1999.
Carloni, L.P., et al., "A Methodology for Correct-by-Construction Latency Insensitive Design", *ICCAD '99: Proceedings of the 1999 IEEE/ACM International Conference on Computer-aided Design*, pp. 309-315, 1999.
Cong, J., et al., "Physical Planning with Retiming", *ICCAD-2000: Proceedings of the 2000 IEEE/ACM International Conference on Computer-aided Design*, pp. 2-7, 2000.
Cormen, T.H., et al., *Introduction to Algorithms*, MIT Press and McGraw Hill, Third Edition, pp. 651-655, 2009.
Dasdan, A., "Experimental Analysis of the Fastest Optimum Cycle Ratio and Mean Algorithms", *ACM Transactions on Design Automation of Electronic Systems*, vol. 9, No. 4, pp. 385-418, Oct. 2004.
Deokar, R.B., et al., "A Fresh Look at Retiming via Clock Skew Optimization", *DAC '95: Proceedings of the 32nd Annual ACM/IEEE Design Automation Conference*, pp. 310-315, 1995.

(Continued)

*Primary Examiner* — Stacy Whitmore
*Assistant Examiner* — Magid Dimyan
(74) *Attorney, Agent, or Firm* — Ropes & Gray LLP; Jeffrey H. Ingerman

(57) ABSTRACT

A method of configuring a programmable integrated circuit device with a user logic design includes accepting a first user input defining the user logic design, accepting a second user input defining latency characteristics of the user logic design, determining a configuration of the programmable integrated circuit device having the user logic design, and retiming the configuration based on the second user input.

20 Claims, 11 Drawing Sheets

(56) References Cited

OTHER PUBLICATIONS

Hurst, A.P., et al., "Physical Placement Driven by Sequential Timing Analysis", *ICCAD-2004: Proceedings of the 2004 IEEE/ACM International Conference on Computer-aided Design*, pp. 379-386, 2004.

Leiserson, C.E., et al., "Retiming Synchronous Circuitry", Digital Equipment Corporation, Aug. 20, 1986, published in *Algorithmica*, vol. 6, No. 1, pp. 5-35, Jun. 1991.

Maheshwari, N., et al., *Timing Analysis and Optimization of Sequential Circuits*, Springer, pp. 9, 14-17, 1998.

Manohararajah, V., et al., "Heuristics for Area Minimization in LUT-Based FPGA Technology Mapping", *IEEE Transactions on CAD*, vol. 25, No. 11, pp. 2331-2340, Nov. 2006.

Singh, D.P., et al., Integrated Retiming and Placement for Field Programmable Gate Arrays, *FPGA'02: ACM International Symposium on Field Programmable Gate Arrays*, pp. 67-76, Feb. 2002.

Weaver, N., et al., "Post-Placement C-Slow Retiming for the Xilinx Virtex FPGA", *FPGA'03: ACM International Symposium on Field Programmable Gate Arrays*, pp. 185-194, Feb. 2003.

Weaver, N., et al., "The Effects of Datapath Placement and C-Slow Retiming on Three Computational Benchmarks" *FCCM'02: The 10th Annual IEEE Symposium on Field-Programmable Custom Computing Machines*, pp. 303-306, Feb. 2003.

Eguro, K., "Supporting High-Performance Pipelined Computation in Commodity-Style FPGAs", University of Washington doctoral dissertation, pp. 1-168 (2008).

Li, S., et al., "QuickRoute: A Fast Routing Algorithm for Pipelined Architectures", *2004 IEEE International Conference on Field-Programmable Technology* pp. 73-80 (2004).

Sharma, A., et al., "PipeRoute: A Pipelining-Aware Router for FPGAs" *FPGA '03: Proceedings of the 2003 ACM/SIGDA eleventh international symposium on Field programmable gate arrays*, pp. 68-77 (Feb. 23-25, 2003).

Singh, D., et al., "The Case for Registered Routing Switches in Field Programmable Gate Arrays", *FPGA '01: Proceedings of the 2001 ACM/SIGDA ninth international symposium on Field programmable gate arrays*, pp. 161-169 (Feb. 11-13, 2001).

Tsu, W., et al., "HSRA: High-Speed, Hierarchical Synchronous Reconfigurable Array", *FPGA '99: Proceedings of the 1999 ACM/SIGDA seventh international symposium on Field programmable gate arrays*, pp. 125-134 (1999).

\* cited by examiner

```
set_global_assignment -name MIN_CORE_JUNCTION_TEMP 0
set_global_assignment -name MAX_CORE_JUNCTION_TEMP 85
set_global_assignment -name DEVICE_FILTER_SPEED_GRADE FASTEST
set_global_assignment -name ERROR_CHECK_FREQUENCY_DIVISOR 256
set_global_assignment -name VERILOG_FILE xor6.v
set_global_assignment -name VERILOG_FILE crcwrap.v
set_global_assignment -name VERILOG_FILE crcdump.v
set_global_assignment -name OPTIMIZE_HOLD_TIMING "ALL PATHS"
set_instance_assignment -name LATENCY_TOLERANT_SPECIFIC 8 -to clk1
set_instance_assignment -name LATENCY_TOLERANT_VARIABLE ON -to clk2
```

FIG. 4

```
set_global_assignment -name MIN_CORE_JUNCTION_TEMP 0
set_global_assignment -name MAX_CORE_JUNCTION_TEMP 85
set_global_assignment -name DEVICE_FILTER_SPEED_GRADE FASTEST
set_global_assignment -name ERROR_CHECK_FREQUENCY_DIVISOR 256
set_global_assignment -name VERILOG_FILE xor6.v
set_global_assignment -name VERILOG_FILE crcwrap.v
set_global_assignment -name VERILOG_FILE crcdump.v
set_global_assignment -name OPTIMIZE_HOLD_TIMING "ALL PATHS"
set_instance_assignment -name LATENCY_INSENSITIVE  -to clk1
    -input_valid module1:valid_o
    -output_valid module2:valid_o
    -input_stop module3:stop_o
    -output_stop module2:stop_o
```

FIG. 5

```
set_global_assignment -name MIN_CORE_JUNCTION_TEMP 0
set_global_assignment -name MAX_CORE_JUNCTION_TEMP 85
set_global_assignment -name DEVICE_FILTER_SPEED_GRADE FASTEST
set_global_assignment -name ERROR_CHECK_FREQUENCY_DIVISOR 256
set_global_assignment -name VERILOG_FILE xor6.v
set_global_assignment -name VERILOG_FILE crcwrap.v
set_global_assignment -name VERILOG_FILE crcdump.v
set_global_assignment -name OPTIMIZE_HOLD_TIMING "ALL PATHS"
set_instance_assignment -name LATENCY_INSENSITIVE -to parent1:parent2:module1
    -input_valid module1:valid_o
    -output_valid module2:valid_o
    -input_stop module3:stop_o
    -output_stop module2:stop_o
set_instance_assignment -name LATENCY_TOLERANT_VARIABLE ON -to parent3:parent4:module2
```

FIG. 6

```
module crcwrap /* synthesis latency_tolerant_variable */ (
    input clk,
    input [127:0] datai,
    output [127:0] datao
);

...

endmodule
```

FIG. 7

```
module crcli /* synthesis latency_insensitive */ (
    input clk,
    output stopo /* synthesis latency_insensitive stop_out */,
    input validi /* synthesis latency_insensitive valid_in */,
    input [127:0] datai,
    input stopi /* synthesis latency_insensitive stop_in */,
    output valido /* synthesis latency_insensitive valid_out */,
    output [127:0] datao
);

...

endmodule
```

FIG. 8

```
primitive_latency_insensitive_entry inst_entry (
    .valid(ent_valid),
    .stop(ent_stop),
    .datai(datai),
    .datao(ent_data)
);

do_something_interesting inst_interesting (
    .clk(clk),
    .validi(ent_valid),
    .valido(ext_valid),
    .stopo(ent_stop),
    .stopi(ext_stop),
    .datai(ent_data),
    .datao(ext_data)
);

primitive_latency_insensitive_exit inst_exit (
    .valid(ext_valid),
    .stop(ext_stop),
    .datai(ext_data),
    .datao(datao)
);
```

FIG. 9

```
reg [127:0] data0 /* synthesis latency_tolerant_variable */;
reg [127:0] data1 /* synthesis latency_tolerant_specific 10 */;

do_something_interesting0 inst_interesting0 (
    .clk(clk),
    .datai(data0),
    .datao(data0_out)
);

do_something_interesting1 inst_interesting1 (
    .clk(clk),
    .datai(data1),
    .datao(data1_out)
);
```

FIG. 10

```
reg [127:0] data0;
reg [127:0] data1;

primitive_latency_tolerant si_data0 (
    .datai(data0),
    .datao(data0_si)
);

primitive_latency_tolerant si_data1 #(.latency(10)) (
    .datai(data1),
    .datao(data1_si)
);

do_something_interesting0 inst_interesting0 (
    .clk(clk),
    .datai(data0_si),
    .datao(data0_out)
);

do_something_interesting1 inst_interesting1 (
    .clk(clk),
    .datai(data1_si),
    .datao(data1_out)
);
```

FIG. 11

```
reg [127:0] data0 /* synthesis latency_sensitive */;
reg [127:0] data1 /* synthesis latency_sensitive */;

do_something_interesting0 inst_interesting0 (
    .clk(clk),
    .datai(data0),
    .datao(data0_out)
);

do_something_interesting1 inst_interesting1 (
    .clk(clk),
    .datai(data1),
    .datao(data1_out)
);
```

FIG. 12

```
reg [127:0] data0;
reg [127:0] data1;

primitive_latency_sensitive si_data0 (
    .datai(data0),
    .datao(data0_si)
);

primitive_latency_sensitive si_data1 (
    .datai(data1),
    .datao(data1_si)
);

do_something_interesting0 inst_interesting0 (
    .clk(clk),
    .datai(data0_si),
    .datao(data0_out)
);

do_something_interesting1 inst_interesting1 (
    .clk(clk),
    .datai(data1_si),
    .datao(data1_out)
);
```

FIG. 13

SPECIFICATION OF LATENCY IN PROGRAMMABLE DEVICE CONFIGURATION

FIELD OF THE INVENTION

This invention relates to configuration software for programmable integrated circuit devices such as field-programmable gate array (FPGAs) or other types of programmable logic devices (PLDs), and particularly to a user interface for specifying, to configuration software adapted for configuring such devices, any latency flexibility in user logic designs for such devices.

BACKGROUND OF THE INVENTION

Early programmable devices were one-time configurable. For example, configuration may have been achieved by "blowing"—i.e., opening—fusible links. Alternatively, the configuration may have been stored in a programmable read-only memory. Those devices generally provided the user with the ability to configure the devices for "sum-of-products" (or "P-TERM") logic operations. Later, such programmable logic devices incorporating erasable programmable read-only memory (EPROM) for configuration became available, allowing the devices to be reconfigured.

Still later, programmable devices incorporating static random access memory (SRAM) elements for configuration became available. These devices, which also can be reconfigured, store their configuration in a nonvolatile memory such as an EPROM, from which the configuration is loaded into the SRAM elements when the device is powered up. These devices generally provide the user with the ability to configure the devices for look-up-table-type logic operations.

While it may have been possible to configure the earliest programmable logic devices manually, simply by determining mentally where various elements should be laid out, it was common even in connection with such earlier devices to provide programming software that allowed a user to lay out logic as desired and then translate that logic into a configuration for the programmable device. With current larger devices, it would be impractical to attempt to lay out the logic without such software.

Some user logic designs would be able to operate at higher clock speeds if the designs could be retimed—e.g., by inserting pipeline registers at various locations in the designs. However, pipelining can introduce latency, and different user logic designs may be more or less tolerant of latency.

SUMMARY OF THE INVENTION

Several different methods for specifying to configuration software the latency tolerance or sensitivity of different portions of a user logic design are provided. Once this information is provided to the configuration software, the software can take the information into account to attempt to maximize the operating speed of the device configured with the user logic design.

Therefore, in accordance with the present invention there is provided a method of configuring a programmable integrated circuit device with a user logic design. The method includes accepting a first user input defining the user logic design, accepting a second user input defining latency characteristics of the user logic design, determining a configuration of the programmable integrated circuit device having the user logic design, and retiming the configuration based on the second user input.

A machine-readable data storage medium encoded with instructions for carrying out such a method also is provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which:

FIG. 4 represents a text-file in which global latency tolerance characteristics in a device are specified;

FIG. 5 represents a text-file in which global latency insensitivity characteristics in a device are specified;

FIG. 6 represents a text-file in which latency characteristics of portions of a device are specified;

FIG. 7 represents hardware description language establishing a portion of a device and specifying through a comment-command format that that portion is latency-tolerant;

FIG. 8 represents hardware description language establishing a portion of a device and specifying through a comment-command format that that portion is latency-insensitive;

FIG. 9 represents hardware description language establishing a portion of a device and specifying through instantiation of a primitive that that portion is latency-tolerant;

FIG. 10 represents hardware description language establishing a signal registers of a device and specifying through a comment-command format that those signal registers are latency-tolerant;

FIG. 11 represents hardware description language establishing a signal registers of a device and specifying through instantiation of primitives that those signal registers are latency-tolerant;

FIG. 12 represents hardware description language establishing a signal registers of a device and specifying through a comment-command format that those signal registers are latency-sensitive and therefore excluded from a global specification of latency tolerance or latency insensitivity;

FIG. 13 represents hardware description language establishing a signal registers of a device and specifying through instantiation of primitives that those signal registers are latency-sensitive and therefore excluded from a global specification of latency tolerance or latency insensitivity;

DETAILED DESCRIPTION OF THE INVENTION

Programmable integrated circuit device configuration software can use various techniques to optimize performance of a programmable integrated circuit device by modifying the cycle-by-cycle behavior of a user logic design. Retiming is an example of an optimization that takes advantage of register positioning flexibility to minimize the length of register-to-register paths, without changing the functionality of the underlying circuitry of the device (it being assumed that the device in which the design is being implemented is provided with sufficient registers to place as needed). Other more powerful transformations that improve performance require altering the underlying circuitry.

Figure 1:
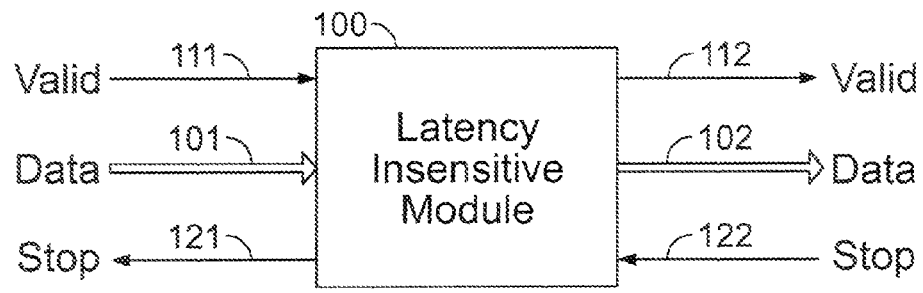
FIG. 1 is a schematic illustration of a latency-insensitive logic module of a type that may be used with embodiments of the present invention.

For example, in one known type of circuit design referred to as "latency-insensitive," a circuit module 100 as shown in FIG. 1 can be paused and restarted. In addition to data input and output terminals 101, 102, module 100 may have an input-valid terminal which receives a signal 111 (e.g., from a similar upstream module) that indicates that input 101 is a valid input accepting any new inputs. Module 100 will ignore input 101 until signal 111 indicates that signal 101 is valid (because the upstream device has finished processing it). Module 100 will similarly send a signal 112 to indicate to a downstream module that module 100 is finished operating on the current input and that therefore data 102 is valid and the downstream module can commence operations on data 102. Conversely, as long as module 100 is processing data, and therefore cannot accept new data, module 100 will send a STOP signal 121 to an upstream module telling the upstream module not to send additional data, and will not output data 102 as long as it is receiving a STOP signal 122 from a downstream module.

Figure 2:
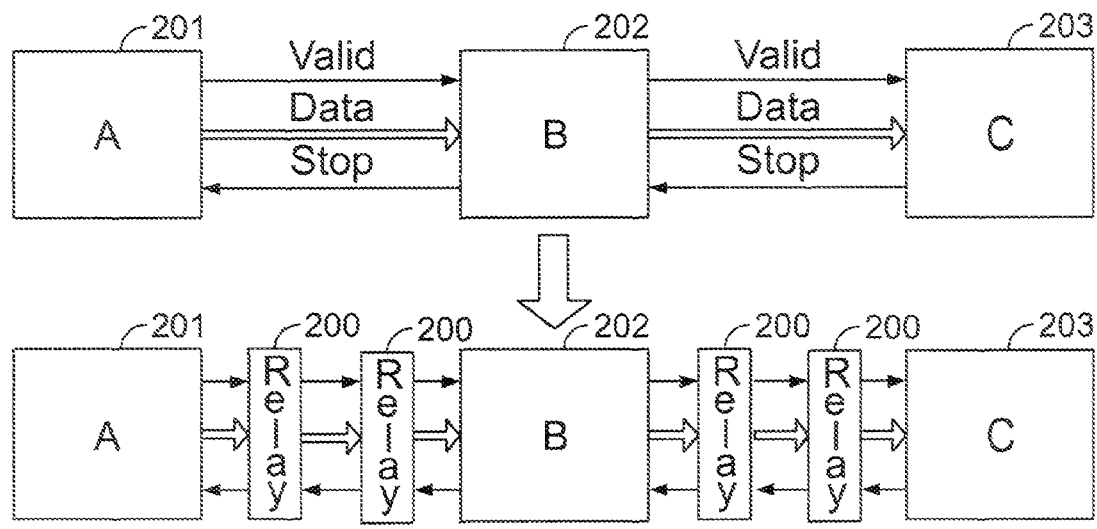
FIG. 2 is a schematic illustration of a pipelined set of latency-insensitive logic modules of FIG. 1.

As seen in FIG. 2, in which each module 201, 202, 203 is a latency-insensitive module like module 100, connections to and from a latency-insensitive module can be pipelined by inserting pipeline stages called relay stations 200. As long as the relay stations properly relay the VALID and STOP signals 111, 121, 112, 122, the entire design will work. While each result may arrive at its respective destination later than it would have without pipelining, the relative timing of each stage will be correct. Connections to and from complex modules are often on critical paths, and latency-insensitive design can be one way of handling large interconnect delays between modules.

Even in situations in which a logic design has not been implemented in a latency-insensitive manner, it is possible to transform a synchronous module into a latency-insensitive module by wrapping it in a shell module, which is then responsible for starting and stopping the clock of the synchronous module, and for responding to and generating the VALID and STOP signals to coordinate communication between the synchronous module and other modules.

Where a user logic design includes latency-insensitive modules—whether those modules are inherently latency-insensitive, or rendered latency-insensitive using a shell module—if the programmable device configuration software knows which modules are latency-insensitive, it could potentially add relay stations 200 automatically as part of its optimization process. However, it is not easy to detect automatically whether or not a module is latency-insensitive.

Figure 3:
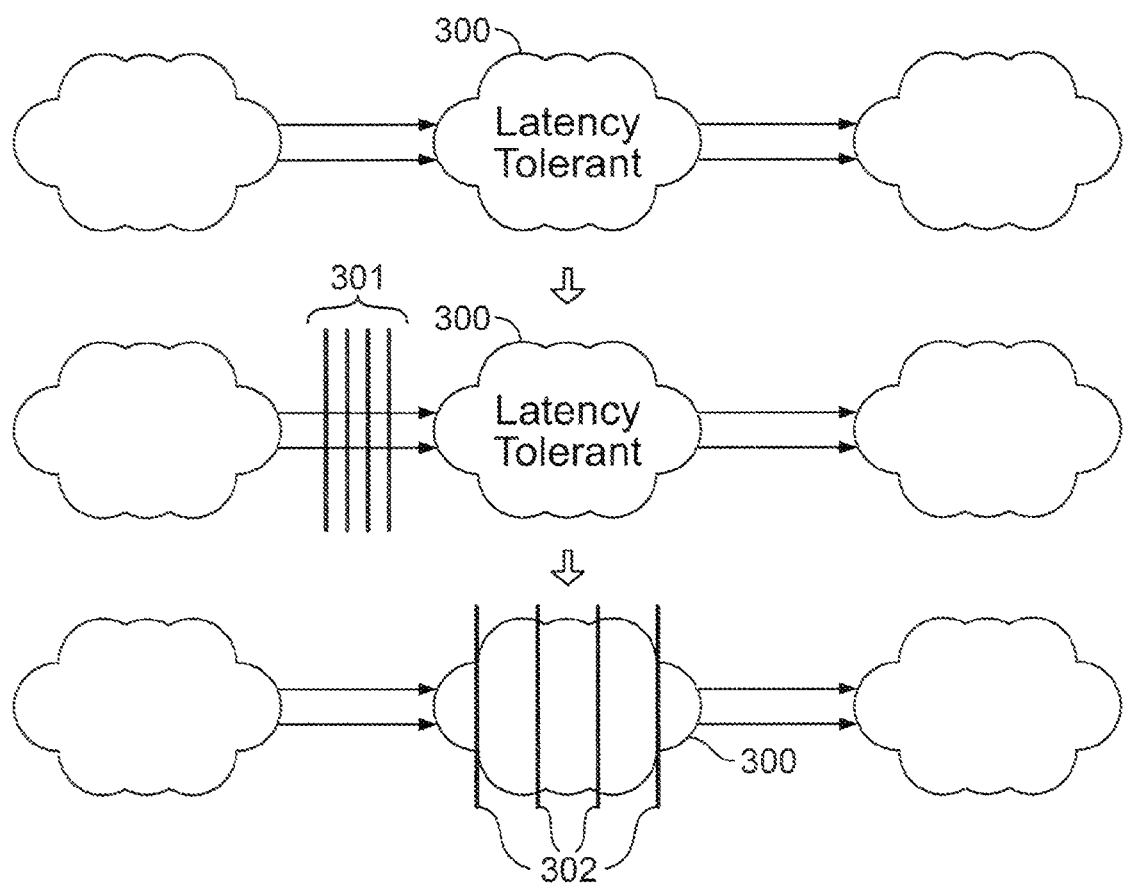
FIG. 3 is a schematic illustration of retiming of a latency-tolerant logic module.

As another example, another type of circuit design, which may be referred to as "latency-tolerant," is shown in FIG. 3, and also is described in copending, commonly-assigned U.S. patent application Ser. No. 13/593,665, filed Aug. 24, 2012. A module 300 that is latency-tolerant can tolerate several cycles of delay before it begins to see valid data at its inputs and is still able to produce valid data at its outputs. This tolerance provides flexibility for the configuration software to insert extra register stages 301—e.g., four, in the drawing—ahead of the module 300. Critical paths within the module 300 can then be shortened by performing a retiming operation, moving those registers 301 to locations 302 within module 300.

Whether a user logic design, or a portion thereof, is latency-tolerant or latency-insensitive, programmable device configuration software cannot take advantage of those characteristics unless it is made aware of them. Embodiments of the present invention provide various options to users to specify latency tolerance or latency insensitivity.

Some embodiments include enhancements to the hardware-description language (HDL) statements—such as VHDL or Verilog—used to configure a programmable device. For example, the HDL statements in FIG. 4 represent a text-file-based approach for specifying the details of the clocks in a user configuration. These statements embody a mechanism, included in configuration software according to embodiments of the invention, to indicate whether a portion of the user configuration includes portions that are latency-tolerant and, if so, whether the configuration software may add registers in front of the portion as it sees fit or whether the software is constrained to use only a specific amount of latency in front of the portion.

In the example shown in FIG. 4, in addition to the normal declaration statements, the two final statements indicate that a clock, clk1, is latency-tolerant and needs a specific latency of 8 (i.e., the software must insert a latency of 8), and another clock, clk2, is latency-tolerant and can tolerate an arbitrary amount of extra latency. Other alternatives are possible. For example, although not shown, it may be possible to specify a range of permissible latency which the software is free to apply. Such a range may run from 0 to a specific maximum, from a specific minimum to an arbitrary (theoretically infinite) maximum, of from a specific minimum to a specific maximum.

A similar approach may be used to specify latency insensitivity, which also requires specifying an input valid signal, an output valid signal, an input stop signal, and an output stop signal. The HDL declarations shown in FIG. 5 include, as the last five lines, the specification of clock signal clk as being latency insensitive, including specification of the valid signals and stop signals.

The foregoing examples of FIGS. 4 and 5 show the specification of entire clock domains as being latency-tolerant or latency-insensitive. It is also within the invention to specify latency tolerance or latency insensitivity for particular portions of a user logic design. For example, in the example shown in FIG. 6, the last line specifies that parent3:parent4:module2 is latency-tolerant by a variable amount (i.e., the software has discretion). The preceding five lines specify that parent41:parent2:module1 is latency-insensitive, and specify the valid and stop signals for that module.

Each of the foregoing "declaration"-type commands, which are shown above as text statements, can also be implemented through a graphical user interface in configuration software that has such an interface.

Another way of specifying latency tolerance or latency insensitivity of a module in a user configuration—rather than a declaration-type command—is to include the specification directly in the HDL statements that establish the module. Many HDL synthesis tools are able to understand special directives embedded in comments within the HDL file. This mechanism can be used to provide a way of specifying latency tolerance or latency insensitivity to the configuration software. FIG. 7 is an example of HDL (in this case, Verilog) statements that establish a module that is specified to be latency-tolerant. Similarly, FIG. 8 is an example of HDL (in this case, Verilog) statements that establish a module that is latency-insensitive. In describing the latency insensitivity, some input and output ports of the module have been marked as the special valid and stop signals required to implement the latency-insensitive protocol. In both FIG. 7 and FIG. 8, the relevant comments begin with keywords that the compiler recognizes as indicating a command, and then the commands themselves follow.

While specification of latency tolerance or latency insensitivity in the HDL statements that establish the module can be used either alone, or as a supplement to the declaration-type commands described earlier, if the HDL statement method is used, it will affect every instance of a module defined by those statements. On the other hand, the declaration-type command method allows a user to target a particular instance of the module.

Some versions of configuration software may not support the embedding of commands within HDL comments. In such a case, latency-tolerant or latency-insensitive primitives can be provided. For example, the HDL may support entry and exit primitives that can be instantiated in a user logic design to indicate that a particular region of logic is latency-tolerant or latency-insensitive. As an example, FIG. 9 shows the instantiation of primitives that indicate that the signals going into and out of a particular module are latency-insensitive. In the examples of FIGS. 7 and 8, those indications might have been provided in comments.

Latency tolerance in particular, as opposed to latency insensitivity, does not involve any complex protocol signals. Therefore signals, or wires, or registers, can be designated as being latency-tolerant (although they cannot be made latency-insensitive). FIG. 10 shows an example of two sets of registers are marked as latency-tolerant. In this particular example, commands embedded in the HDL comments specify that the first register can tolerate an arbitrary number of cycles of latency, while the second register can tolerate only a specific amount of latency.

As in the case of circuit modules, latency tolerance of signals, registers or wires can be specified using primitives rather than commands embedded in comments. FIG. 11 shows an example of primitives used for that purpose.

As noted above, it is possible to designate an entire domain as being latency-tolerant or latency-insensitive, or to designate individual modules as being latency-tolerant or latency-insensitive. In some user logic designs, it may be that almost all of a domain is latency-tolerant or latency-insensitive, but one or a few modules in that domain are not latency-tolerant or latency-insensitive. In accordance with another embodiment, rather than having to individually specify that the vast majority of modules in a domain are latency-tolerant or latency-insensitive, the domain can be specified to be latency-tolerant or latency-insensitive, and a further specification excluding one or more modules from being latency-tolerant or latency-insensitive can be made. FIG. 12 shows the inclusion of comment-based commands showing that a particular pair of registers are latency-sensitive. Such commands would be used for individual elements within a domain that has been specified to be latency-tolerant or latency-insensitive, to exclude the individual elements from that general declaration. FIG. 13 shows an example of using primitives to indicate the same exclusion, to be used in a case where comment-based commands are not available.

In the foregoing description, specification of latency tolerance and latency insensitivity has been described in connection with allowing the programmable device configuration software to optimize a user logic design. However, specification of latency insensitivity also can be used to determine when the input and output from a latency insensitive module can be connected to a variable latency fabric. For example, a network-on-chip (NoC) often provides a variable latency mechanism for transferring data from one point on the chip to another. Such a network is often shared by many modules, and may introduce irregular amounts of latency, so that any data placed on the network may experience a variable amount of latency in reaching its destination. Latency-insensitive modules can tolerate such variable latency through the use of the valid and stop signals. Programmable device configuration software in accordance with embodiments of the invention can also exploit latency-insensitive specifications to determine which modules can safely use variable latency fabrics on a chip, and how the valid and stop signals of the latency-insensitive specification interact with the protocol used by the variable latency fabric.

Figure 14:
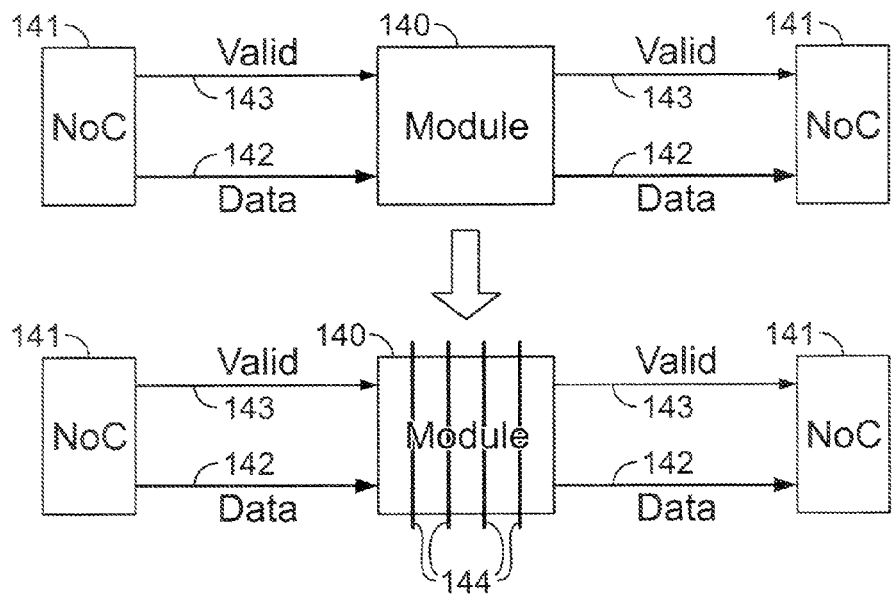
FIG. 14 shows a latency-tolerant module connected to a network-on-chip.

Conversely, a NoC may use a particular protocol to move data into and out of the NoC. Depending on the protocol that is used by the NoC, the programmable device configuration software may be able to derive latency tolerance or latency insensitivity of a module by examining the connectivity of the module into and out of the NoC. For example, input data 142 to a module 140 from the NoC 141 may use a VALID signal 143 to indicate the presence of valid data, and similarly on the output side, as shown in the example in FIG. 14. It can be assumed that such a module is latency-tolerant. As shown in FIG. 14, this allows the module to be pipelined by adding registers 144.

Figure 15:
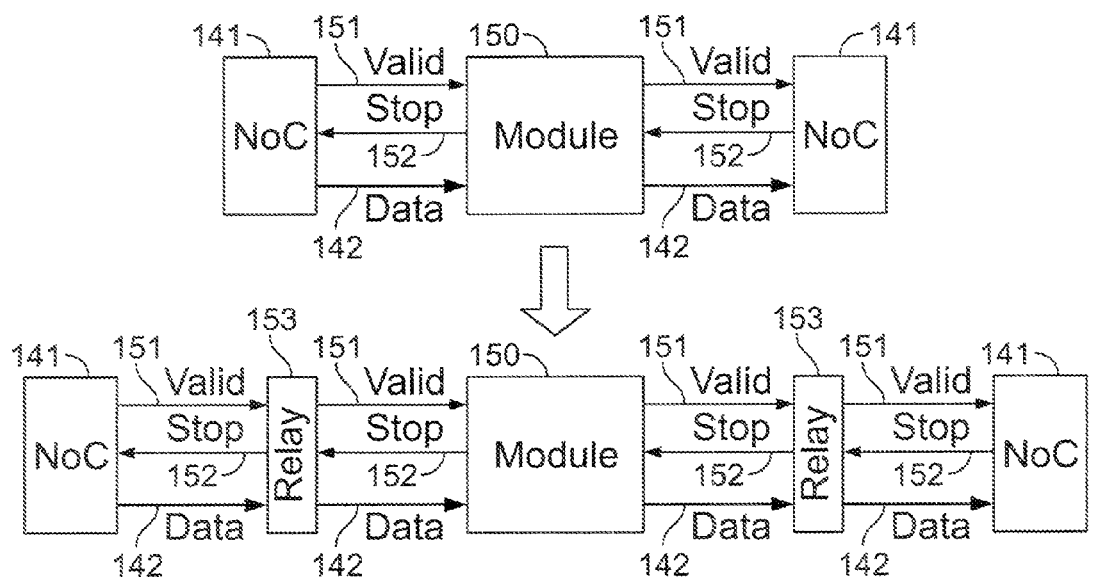
FIG. 15 shows a latency-insensitive module connected to a network-on-chip.

Similarly, if the flow of data into and out of a module 150 uses both VALID and STOP signals 151, 152 as in the example in FIG. 15, it can be assumed that module 150 is latency-insensitive. As shown in FIG. 15, this allows the configuration software to insert relay stations 153 in the connections from the NoC 141 to the module 150 and from the module 150 back to the NoC 141.

Figure 16:
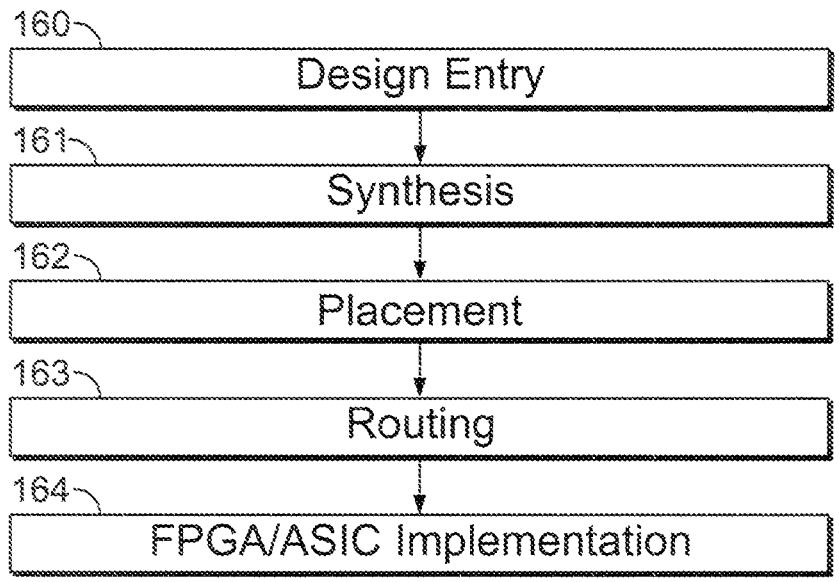
FIG. 16 shows a known programmable device configuration design flow.
Figure 17:
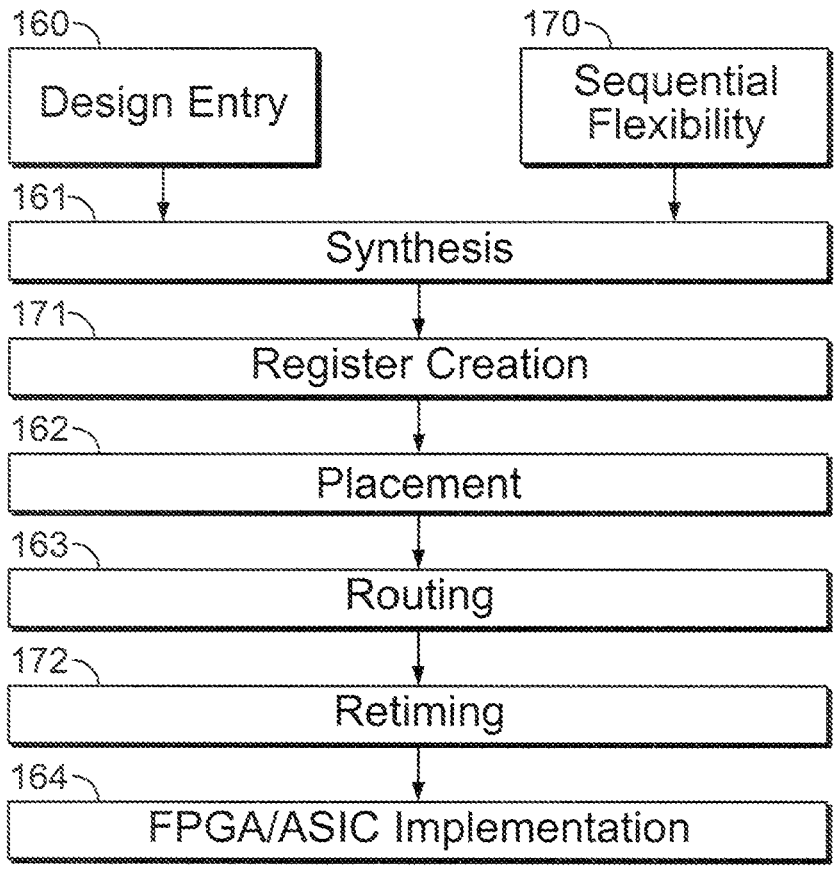
FIG. 17 shows a programmable device configuration design flow in accordance with embodiments of the invention.

There are several ways in which programmable device configuration software, running on a suitable processor such a personal computer or workstation, can process the latency specifications entered by a user in accordance with the foregoing discussion. One example is illustrated in FIGS. 16 and 17. FIG. 16 is a standard design flow that begins with design entry 160 and goes through the steps of synthesis 161, placement 162 and routing 163 before producing the final implementation 164 of the user logic design in the target device. In accordance with embodiments of the invention, the design flow of FIG. 16 can be modified as shown in FIG. 17. Along with design entry 160, the user enters latency specifications 170. Register creation 171 now follows synthesis 161, inserting additional registers based on the flexibility specified by the user at 170. Following routing 163, retiming 172 is added, in which the registers added at 171 may be moved around the design to optimize circuit timing, before the design is output at 164.

Thus it is seen that programmable device configuration software that allows a user to specify information regarding latency tolerance or latency insensitivity, and then can use that information to optimize a user logic design, and a corresponding method, have been provided.

Instructions for carrying out a method according to this invention for programming a programmable device may be encoded on a machine-readable medium, to be executed by a suitable computer or similar device to implement the method of the invention for programming or configuring PLDs or other programmable devices. For example, a personal computer may be equipped with an interface to which a PLD can be connected, and the personal computer can be used by a user to program the PLD using suitable software tools as described above.

Figure 18:
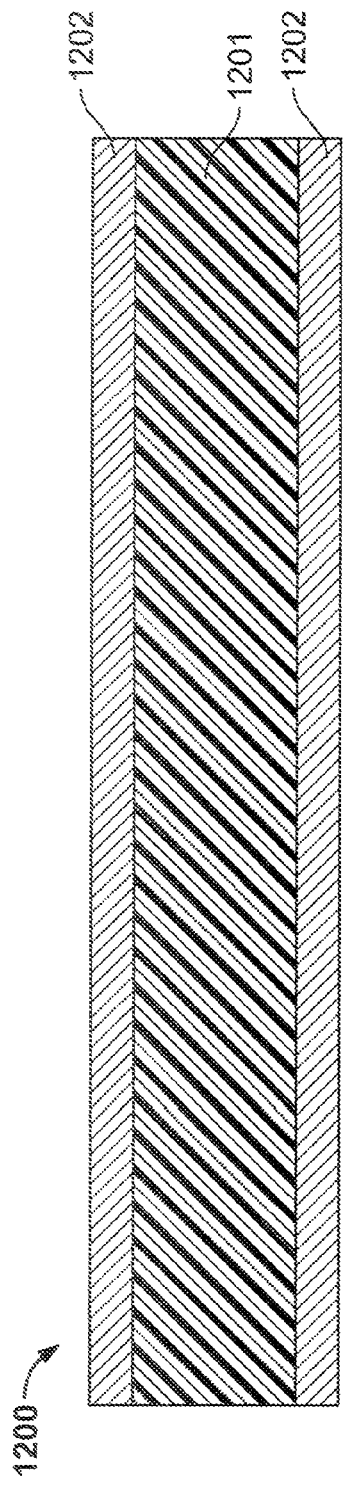
FIG. 18 is a cross-sectional view of a magnetic data storage medium encoded with a set of machine-executable instructions for performing the method according to the present invention.

FIG. 18 presents a cross section of a magnetic data storage medium 1200 which can be encoded with a machine executable program that can be carried out by systems such as the aforementioned personal computer, or other computer or similar device. Medium 1200 can be a floppy diskette or hard disk, or magnetic tape, having a suitable substrate 1201, which may be conventional, and a suitable coating 1202, which may be conventional, on one or both sides, containing magnetic domains (not visible) whose polarity or orientation can be altered magnetically. Except in the case where it is magnetic tape, medium 1200 may also have an opening (not shown) for receiving the spindle of a disk drive or other data storage device.

The magnetic domains of coating 1202 of medium 1200 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 19:
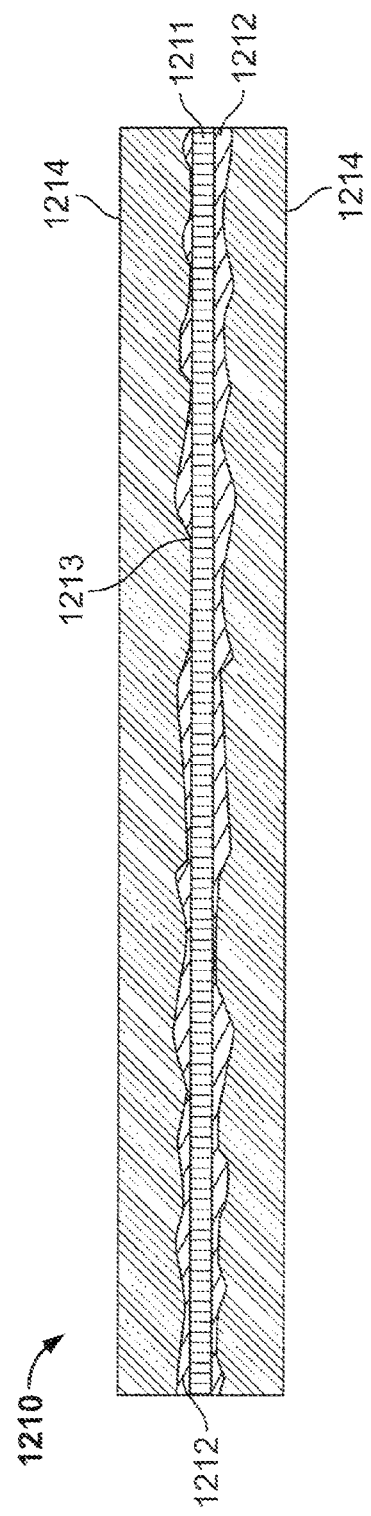
FIG. 19 is a cross-sectional view of an optically readable data storage medium encoded with a set of machine executable instructions for performing the method according to the present invention.

FIG. 19 shows a cross section of an optically-readable data storage medium 1210 which also can be encoded with such a machine-executable program, which can be carried out by systems such as the aforementioned personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

Figure 20:
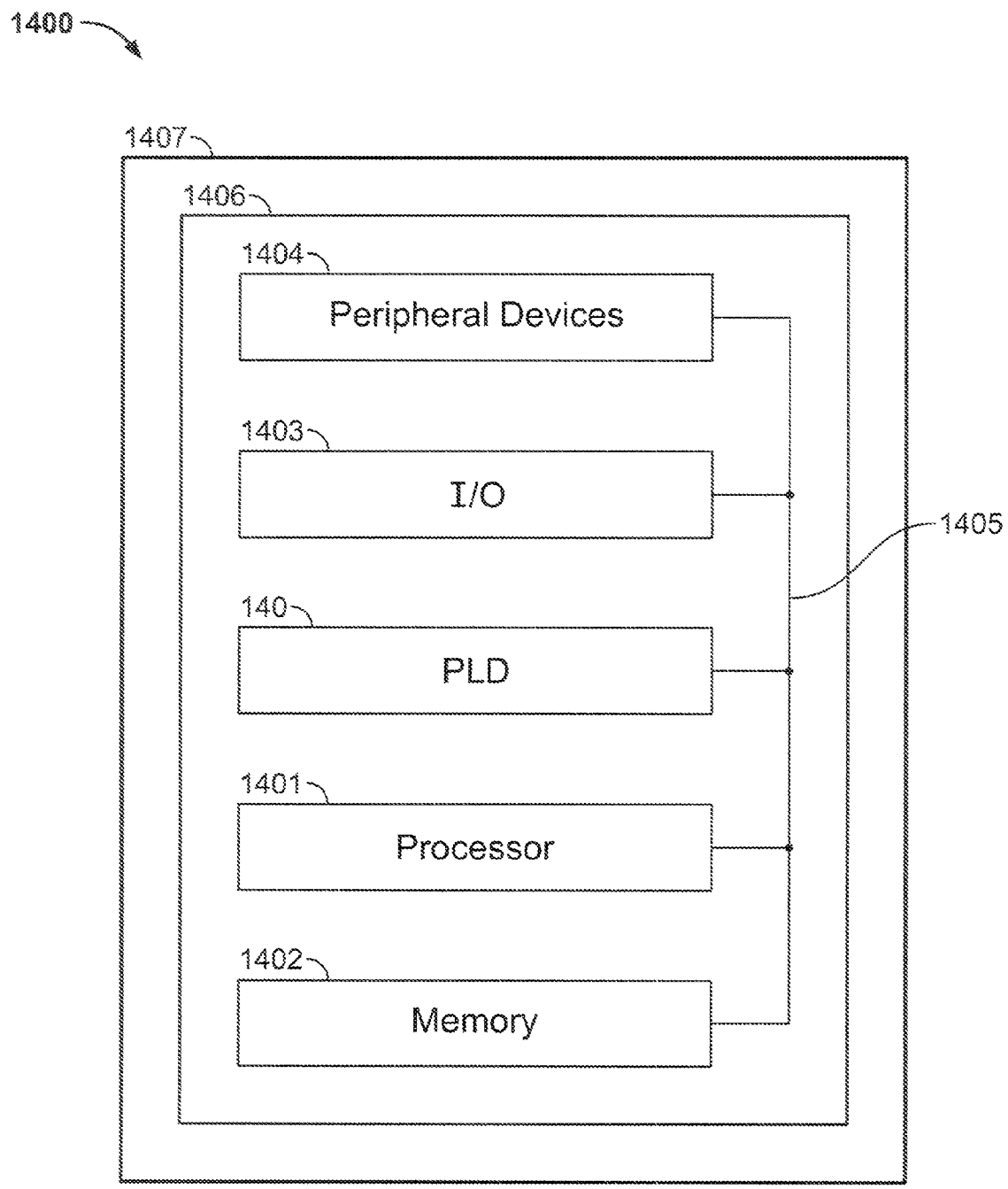
FIG. 20 is a simplified block diagram of an illustrative system employing a programmable logic device configured in accordance with the present invention.

A PLD 140 programmed or configured according to the present invention may be used in many kinds of electronic devices. One possible use is in a data processing system 1400 shown in FIG. 20. Data processing system 1400 may include one or more of the following components: a processor 1401; memory 1402; I/O circuitry 1403; and peripheral devices 1404. These components are coupled together by a system bus 1405 and are populated on a circuit board 1406 which is contained in an end-user system 1407.

System 1400 can be used in a wide variety of applications, such as computer networking, data networking, instrumentation, video processing, digital signal processing, or any other application where the advantage of using programmable or reprogrammable logic is desirable. PLD 140 can be used to perform a variety of different logic functions. For example, PLD 140 can be configured as a processor or controller that works in cooperation with processor 1401. PLD 140 may also be used as an arbiter for arbitrating access to a shared resources in system 1400. In yet another example, PLD 140 can be configured as an interface between processor 1401 and one of the other components in system 1400. It should be noted that system 1400 is only exemplary, and that the true scope and spirit of the invention should be indicated by the following claims.

Various technologies can be used to implement PLDs 140 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device with a user logic design, said method comprising:
   accepting a first user input defining said user logic design;
   accepting a second user input defining latency characteristics of said user logic design;
   determining a configuration of said programmable integrated circuit device having said user logic design;
   retiming said configuration based on said second user input; and
   loading said retimed configuration into memory of a programmable integrated circuit device.

2. The method of claim 1 wherein said second user input is an indication of latency tolerance.

3. The method of claim 1 wherein said second user input is an indication of latency insensitivity.

4. The method of claim 3 wherein said second user input further indicates protocol signals of said latency insensitivity.

5. The method of claim 1 wherein said accepting a second user input comprises accepting entry of said second user input in a graphic interface.

6. The method of claim 1 wherein said accepting a second user input comprises accepting entry of said second user input in a text interface.

7. The method of claim 6 wherein said second user input is entered as a comment in a hardware description language.

8. The method of claim 6 wherein said second user input is entered as a hardware description language primitive.

9. The method of claim 1 wherein said second user input defines global latency characteristics of said user logic design.

10. The method of claim 1 wherein said second user input defines latency characteristics of a portion of said user logic design.

11. A non-transitory machine readable storage medium encoded with instructions for performing a method of configuring a programmable integrated circuit device with a user logic design, said instructions comprising:
 instructions to accept a first user input defining said user logic design;
 instructions to accept a second user input defining latency characteristics of said user logic design;
 instructions to determine a configuration of said programmable integrated circuit device with said user logic design; and
 instructions to retime said configuration based on said second user input.

12. The non-transitory machine readable storage medium of claim 11 wherein said instructions to accept a second user input comprise instructions to accept an indication of latency tolerance.

13. The non-transitory machine readable storage medium of claim 11 wherein said instructions to accept a second user input comprise instructions to accept an indication of latency insensitivity.

14. The non-transitory machine readable storage medium of claim 13 wherein said instructions to accept a second user input further comprise instructions to accept an indication of protocol signals of said latency insensitivity.

15. The non-transitory machine readable storage medium of claim 11 wherein said instructions to accept a second user input comprise instructions to accept entry of said second user input in a graphic interface.

16. The non-transitory machine readable storage medium of claim 11 wherein said instructions to accept a second user input comprise instructions to accept entry of said second user input in a text interface.

17. The non-transitory machine readable storage medium of claim 16 wherein said instructions to accept a second user input comprise instructions to interpret a comment in a hardware description language.

18. The non-transitory machine readable storage medium of claim 16 wherein said instructions to accept a second user input comprise instructions to interpret a hardware description language primitive.

19. The non-transitory machine readable storage medium of claim 11 wherein said instructions to accept a second user input comprise instructions to accept an indication of latency characteristics of said user logic design.

20. The non-transitory machine readable storage medium of claim 11 wherein said instructions to accept a second user input comprise instructions to accept an indication of latency characteristics of a portion of said user logic design.

* * * * *